(12) United States Patent
Allen et al.

(10) Patent No.: US 7,019,736 B2
(45) Date of Patent: Mar. 28, 2006

(54) METHOD AND APPARATUS FOR IMAGE DISPLAY

(75) Inventors: William J. Allen, Corvallis, OR (US); Mark E. Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 485 days.

(21) Appl. No.: 10/103,394

(22) Filed: Mar. 20, 2002

(65) Prior Publication Data

US 2003/0179192 A1    Sep. 25, 2003

(51) Int. Cl.
*G09G 5/00* (2006.01)

(52) U.S. Cl. .................. 345/207; 345/204; 345/205; 345/206

(58) Field of Classification Search ............... 345/207, 345/88, 112, 327, 472–472.2, 3.1–3.4, 418, 345/667–671, 102, 691, 600, 204–206; 359/630; 348/743, 333.02; 235/472; 382/167; 356/375; 349/113

See application file for complete search history.

(56) References Cited

U.S. PATENT DOCUMENTS

| | | | |
|---|---|---|---|
| 4,021,607 A | | 5/1977 | Amano |
| 5,418,546 A * | | 5/1995 | Nakagakiuchi et al. ........ 345/85 |
| 5,589,852 A | | 12/1996 | Thompson et al. |
| 5,608,528 A * | | 3/1997 | Ogawa ..................... 356/620 |
| 5,650,832 A | | 7/1997 | Poradish et al. |
| 5,731,823 A | | 3/1998 | Miller et al. |
| 5,821,523 A * | | 10/1998 | Bunte et al. ........... 235/472.01 |
| 5,971,545 A | | 10/1999 | Haitz |
| 6,040,946 A * | | 3/2000 | Hebert .................. 359/630 |
| 6,157,396 A * | | 12/2000 | Margulis et al. ........... 345/506 |
| 6,188,379 B1 | | 2/2001 | Kaneko |
| 6,219,011 B1 * | | 4/2001 | Aloni et al. ................ 345/1.3 |
| 6,436,620 B1 * | | 8/2002 | Aylward et al. ........... 430/503 |
| 6,567,134 B1 * | | 5/2003 | Morgan ................... 348/743 |
| 6,567,543 B1 * | | 5/2003 | Shiraiwa et al. ........... 382/167 |
| 6,674,436 B1 * | | 1/2004 | Dresevic et al. ........... 345/472 |
| 6,803,885 B1 * | | 10/2004 | Guttag et al. ................ 345/8 |
| 2002/0005829 A1 | | 1/2002 | Ouchi |
| 2002/0060662 A1 * | | 5/2002 | Hong ..................... 345/102 |
| 2002/0186335 A1 * | | 12/2002 | Tanaka ................... 349/113 |
| 2003/0080962 A1 * | | 5/2003 | Erickson et al. ........... 345/440 |
| 2003/0137494 A1 * | | 7/2003 | Tulbert ................... 345/173 |
| 2003/0142068 A1 * | | 7/2003 | DeLuca et al. ............ 345/156 |
| 2003/0142241 A1 * | | 7/2003 | Allen et al. .............. 348/742 |
| 2003/0227577 A1 * | | 12/2003 | Allen et al. .............. 348/742 |
| 2003/0231260 A1 * | | 12/2003 | Pate et al. ................ 348/744 |
| 2004/0008288 A1 * | | 1/2004 | Pate et al. ................ 348/742 |
| 2004/0036708 A1 * | | 2/2004 | Evanicky et al. ........... 345/691 |
| 2004/0140981 A1 * | | 7/2004 | Clark ..................... 345/600 |
| 2004/0201766 A1 * | | 10/2004 | Funston et al. ......... 348/333.02 |
| 2005/0162381 A1 * | | 7/2005 | Bell et al. ................ 345/156 |

FOREIGN PATENT DOCUMENTS

| JP | 10333599 | 12/1998 |
|---|---|---|
| WO | WO 02/080136 | 10/2002 |

* cited by examiner

*Primary Examiner*—Vijay Shankar
*Assistant Examiner*—Prabodh Dharia

(57) ABSTRACT

The present invention relates to a display system that includes plural light sources, and a controller coupled with the light sources and configured to modify sequencing of the light sources to display an image based on display conditions.

40 Claims, 5 Drawing Sheets

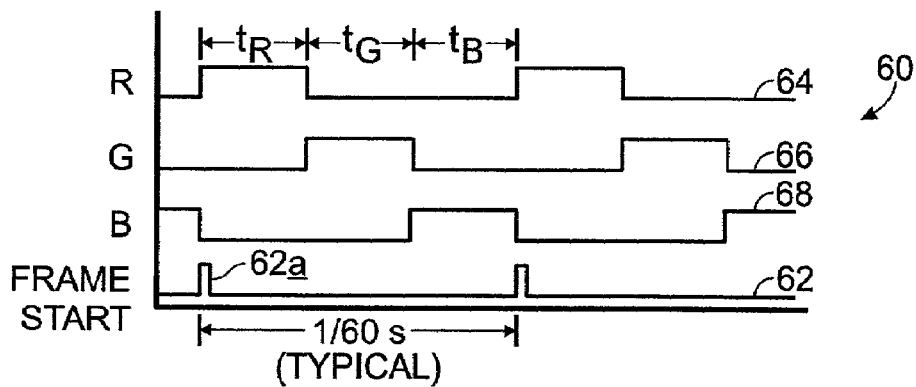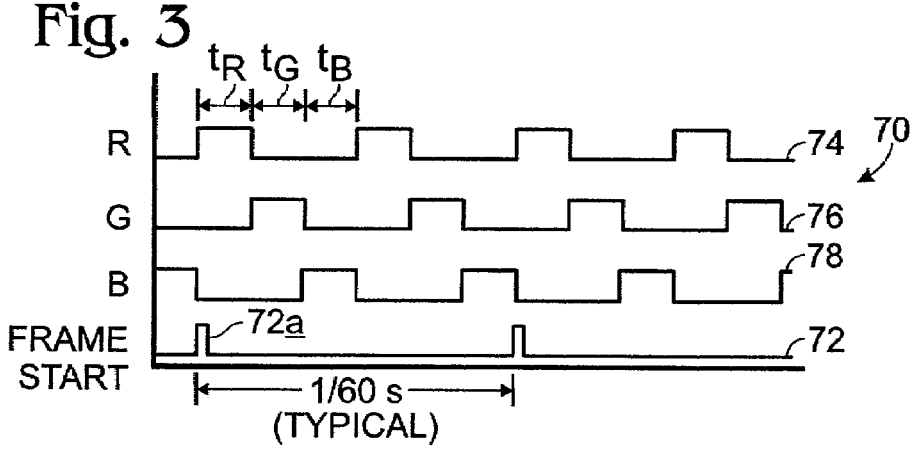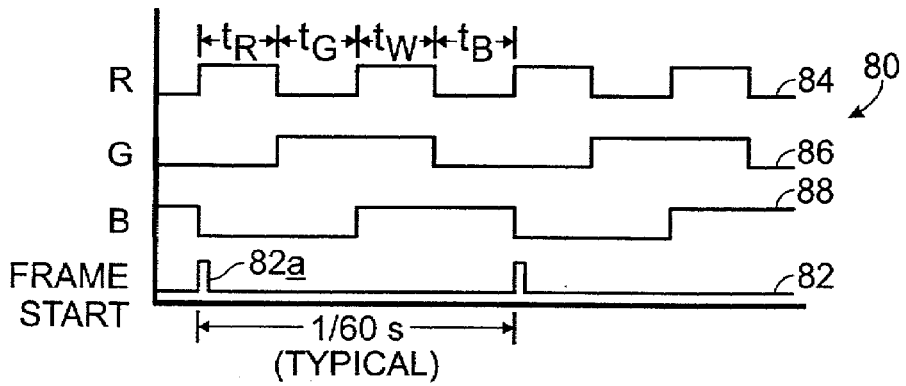

Fig. 5
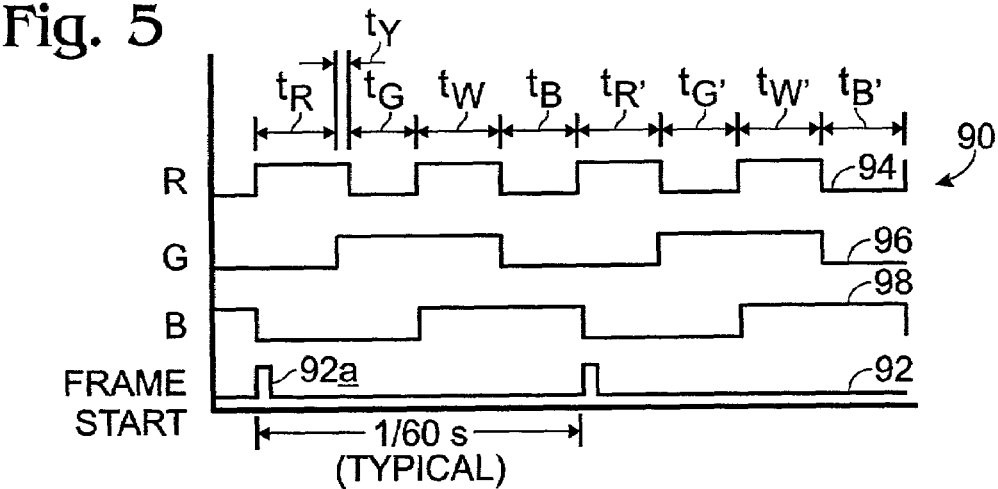
Fig. 9
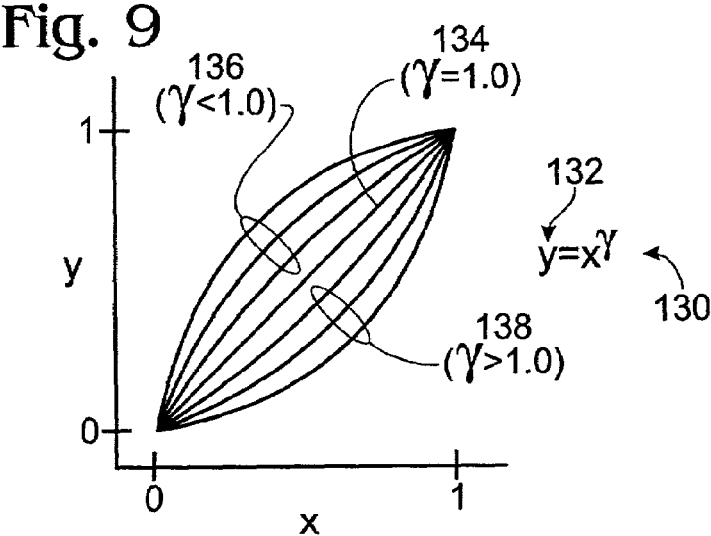
Fig. 10
$R_N = C_{RR} \cdot R_O + C_{RG} \cdot G_O + C_{RB} \cdot B_O$
$G_N = C_{GR} \cdot R_O + C_{GG} \cdot G_O + C_{GB} \cdot B_O$ } 142
$B_N = C_{BR} \cdot R_O + C_{BG} \cdot G_O + C_{BB} \cdot B_O$
$\begin{bmatrix} R_O \\ G_O \\ B_O \end{bmatrix} \cdot \begin{bmatrix} C_{RR} & C_{RG} & C_{RB} \\ C_{GR} & C_{GG} & C_{GB} \\ C_{BR} & C_{BG} & C_{BB} \end{bmatrix} = \begin{bmatrix} R_N \\ G_N \\ B_N \end{bmatrix}$ } 144

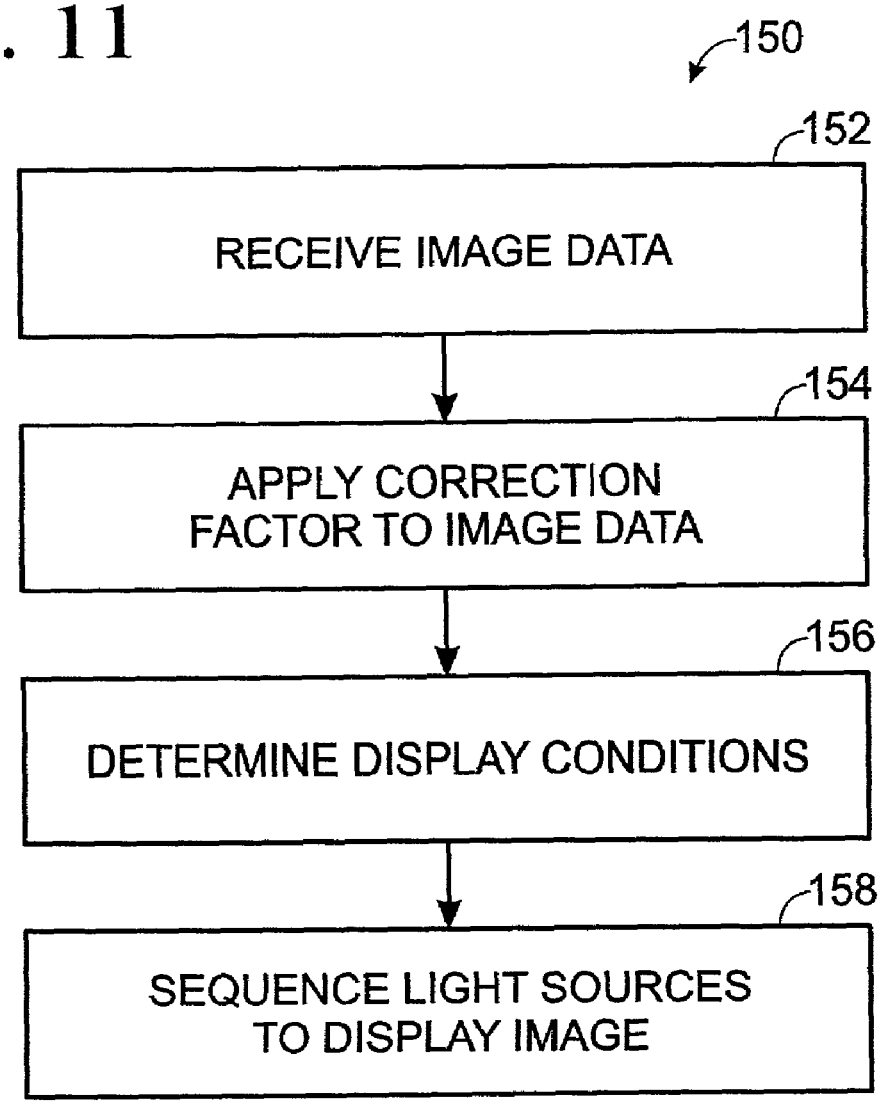

METHOD AND APPARATUS FOR IMAGE DISPLAY

BACKGROUND

Various techniques for displaying images exist. One such approach is accomplished with the use of digital projectors. Typically, such projectors are configured to have a fixed gamut. In this context, gamut refers to an available range of colors. For such fixed-gamut projectors, it is typical to have a gamut that is either better-suited for displaying graphical images, or one better-suited for displaying video images. In this respect, a gamut for displaying graphical images may include more brightness (e.g. a higher intensity white point) at the expense of chroma, or color intensity. Conversely, a gamut for displaying video images may include more chroma at the expense of brightness.

Using a single fixed-gamut projector to display both graphical images and video images thus may result in a reduction in the quality of one type of image, or may result in a reduction of quality of both types of images. Therefore, multiple fixed-gamut projectors have sometimes been employed to achieve high-quality display of both still and video images. However, purchasing multiple fixed-gamut projectors is undesirable as such projectors may be expensive. Also, even with multiple fixed-gamut projectors, quality of mixed media images (e.g. graphical images and video images in the same presentation) may suffer. Furthermore, such projectors typically employ a color wheel driven by a motor and, therefore, may generate more noise and consume more power than is desired. Moreover, these projectors may require synchronization of the mechanical color wheel system with an electrical system, which may further limit performance and/or add to cost.

SUMMARY OF THE INVENTION

The present invention relates to a display system that includes plural light sources, and a controller coupled with the light sources and configured to modify sequencing of the light sources to display an image based on display conditions.

DESCRIPTION OF THE FIGURES

FIG. 2 is a timing diagram illustrating a timing sequence for 1-time (1×) red, green, blue (RGB) sequential color that may be used to display images according to an embodiment of the present invention;

FIG. 3 is a timing diagram illustrating a timing sequence for 2-times (2×) red, green, blue (RGB) sequential color that may be used to display images according to an embodiment of the present invention;

FIG. 4 is a timing diagram illustrating a timing sequence for 1× red, green, white, blue (RGWB) overlapping sequential color that may be used to display images according to an embodiment of the present invention;

FIG. 5 is a timing diagram illustrating a timing sequence for 1× red, yellow, green, white, blue (RYGWB) overlapping sequential color that may be used to display images according to an embodiment of the present invention;

FIG. 9 is a graph illustrating a non-linear, gamma correction function according to an embodiment of the present invention;

FIG. 10 is a diagram showing a linear matrix correction function according to an embodiment of the present invention.

FIG. 11 is a flowchart showing a method of displaying an image according to an embodiment of the present invention.

DETAILED DESCRIPTION OF THE INVENTION

The present invention is directed to method and apparatus for displaying images. In this context, images may constitute graphics, video, still photos, broadcast television, video games as well as other types of images. Thus the invention is not limited to use with any particular type of image, or source of image data. In this regard, a system for displaying images according to an embodiment of the invention is shown in FIG. 1, and is indicated generally at 10.

Figure 1:
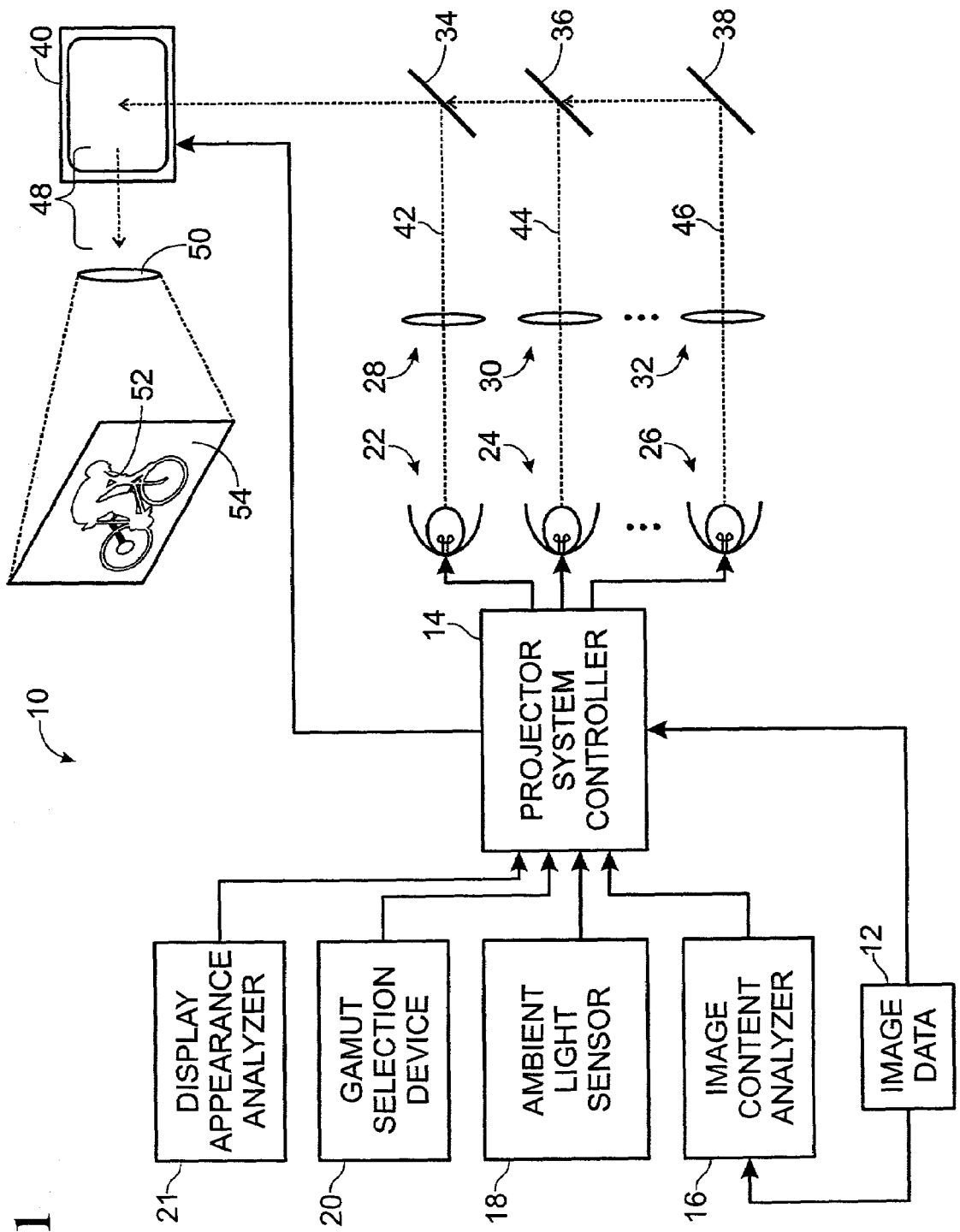
FIG. 1 is a schematic diagram showing a system for displaying images according to an embodiment of the present invention.

As may be seen in FIG. 1, image data 12 may be communicated to a system controller 14, which may take the form of a microprocessor, microcontroller, etc. Various techniques for communicating image data 12 exist. For example, image data 12 may be communicated to controller 14 via a graphics port, a universal serial bus (USB), an infrared connection, a super-video (S-video) port, or any of various communication links. Image data 12 may be directly communicated to controller 14, and thus may be termed raw image data, Alternatively, image data 12 may be preprocessed before being communicated to controller 14. Preprocessing may include applying a correction factor, such as a gamma adjustment or a matrix adjustment. Such techniques may be used to reduce variation in the appearance of displayed images from one type of display to another, and are discussed in further detail below with reference to FIGS. 9 and 10.

System 10 may be configured to display images based on display conditions. In this context, display conditions may include image type, image content, image source, appearance of the displayed image, user preference and/or ambient light conditions (among many other factors). System 10 thus may include an image content analyzer 16, an ambient light sensor 18, a gamut selection device 20 and a display appearance analyzer 21, all coupled with controller 14. It will be appreciated that these features are exemplary, and the invention is not limited to the use of these particular techniques for determining and/or establishing display conditions.

For system 10, controller 14 is further coupled with light sources 22–26. As is indicated in FIG. 1, the number of light sources may vary. For purposes of this discussion, system 10 will be described as being configured with a red light source 22, a green light source 24 and a blue light source 26. It will be appreciated that additional colors may be used, such as white, cyan, yellow and/or magenta, among others. It will also be appreciated that any of these colored light sources may correspond, respectively, to any of light sources 22–26.

In this respect, light sources 22–26, in turn, may be optically coupled, respectively, with optical elements 28–32 and beam combiners 34–38. In this regard, light 42–46 from light sources 22–26 is directed by optical elements 28–32 through beam combiners 34–38 to a spatial light modulator (SLM) 40 by beam combiners 34–38. SLM 40 is typically coupled with controller 14 so as to cooperate in selectively directing light 48, through an optical element 50. Light 48 may include a to-be-displayed image 52, which corresponds with image data 12. As is shown in FIG. 1, image 52 may be displayed on screen 54. SLM 40 may be a digital micro-mirror device (DMD), or any other mechanism capable of selectively directing light to display image 52. As will be appreciated, SLM 40 may be configured to direct light 42–46 towards lens 50 on a pixel-by-pixel basis to form light 48, which may include image 52. Thus, as is discussed further below, controller 14 may sequence light sources 22–26 and may control SLM 40 so as to cooperate, in the foregoing described fashion, to display image 52 on screen 54 on a pixel by pixel basis.

For system 10, image content analyzer 16 may be configured to receive image data 12, in order to examine the image data to formulate image content information. Image content analyzer 16 may then communicate the image content information to controller 14. Such image content information may, for example, include: the number of unique colors included in the image data; the frequency, or a histogram, of each of the unique colors; pixel intensity, such as a average pixel intensity of the image data; and/or changes in image data from one display frame to the next. As will be appreciated, image content analyzer 16 may be implemented, for example, as machine-readable instructions included in a software program or, alternatively, may be implemented using video pipelining hardware (not shown).

Ambient light sensor 18 may also be coupled with controller 14. Sensor 18 may be configured to detect ambient light in an environment where system 10 is being used to display images. In this regard, sensor 18 may be a charge-coupled device (CCD) sensor, or any other sensor capable of detecting light, including a photovoltaic device. Information regarding such ambient light character, such as light intensity and/or color may be communicated from sensor 18 to controller 14. Controller 14 may, in response to such ambient light information, modify the sequence of light sources 22–26 and the operation of SLM 40 to adjust display of image 52. Such techniques are discussed in more detail below.

Gamut selection device 20 may also be coupled with controller 14. In this regard, gamut selection device 20 may be configured to provide for user selection of a display gamut. In this context, gamut refers to the range of colors the device is capable of producing. In this respect, information communicated from gamut selection device 20 to controller 14 may result in controller 14 modifying the sequence of light sources 22–26 and operation of SLM 40 when displaying image 52, such as increasing or reducing the amount of white light generated during a display frame. A higher setting on gamut selection device 20 may result in a brighter image 52 as opposed to a lower setting, or as compared to display of image 52 based solely on image data 12. Alternatively, or additionally, gamut selection device 20 may alter the color temperature of the gamut, or some other attribute of the gamut. Techniques for modifying gamut based on information communicated from gamut selection device 20 are discussed further below.

Display appearance analyzer 21 may also be coupled with controller 14. Display appearance analyzer 21 may be configured to review display image 52 in order to formulate appearance information. Such appearance information thus may be communicated to controller 14 for use in improving the displayed image.

As was previously indicated, controller 14 may sequence light sources 22–26 when displaying image 52. FIGS. 2–5 illustrate exemplary timing diagrams of such sequences. These figures will be discussed with reference to system 10, illustrated in FIG. 1.

Referring now to FIG. 2, a timing diagram illustrating 1-time RGB (1× RGB) timing according to an embodiment of the invention is shown generally at 60. In this context, 1× RGB means that each light source (red, green and blue light sources, as indicated above) is on once (for a predetermined period of time) per display frame of system 10. The timing element for frame start, and for each individual light source, is indicated by an individual timing trace in FIG. 2.

Frame start trace 62 shows a pulse 62a, which indicates the beginning of a display frame, typically 1/60 second, by transitioning from a digital '0' to a digital '1'. As is shown by red (R) trace 64 in FIG. 2, red light source 22 may be turned on at the initiation of such a display frame. Red light source 22 may remain on for time duration $t_R$, as indicated in FIG. 2. Green light source 24 may then be turned on for time duration $t_G$, as indicated by green (G) trace 66, followed by blue light source 26 being turned on for time duration $t_B$, as indicated by blue (B) trace 68. As may also be seen in FIG. 2, $t_R$, $t_G$ and $t_B$ may be approximately equivalent, non-overlapping time periods, though the invention is not so limited, and other timing relationships are possible. For example, if image 52 has a relatively low red content relative to its green and/or blue content, red light source 22 may be on for a shorter period of time than green light source 24 and/or blue light source 26 in a given display frame.

It will be appreciated that although a frame width of 1/60 second is shown here, the present system may provide for variation in frame width from one frame to another, for example, due to variations in the image data. This typically would result in proportional changes in the time durations of each of the differing light sources.

Referring to FIG. 3, a timing diagram illustrating two-times RGB (2× RGB) timing according to an embodiment of the present invention is indicated generally at 70. Frame start trace 72 includes a pulse 72a, which indicates the beginning of a display frame as previously discussed with respect to FIG. 2. As may be seen in FIG. 3, 2× RGB timing is such that each light source is on for a predetermined period of time twice during a display frame, as indicated, respectively by traces 74–78. As is also shown in FIG. 3, this sequence may repeat for successive display frames. Such a sequence may reduce sequential color artifacts relative to 1× RGB timing. Sequential color artifacts, it will be appreciated, are rainbow colored shadows that may trail moving objects in video images.

Other timing sequences are possible, such as 3× RGB and other multiples. Also, nonuniform pulse widths may be used within a single frame, such as where each light source comes on three times a display frame with one of the three time periods being approximately half of the other two. The specific timing relationship may be based on display conditions such as gamut selection, ambient light, image content, and display appearance as were previously discussed. Controller 14 thus may modify the sequence of the light sources to implement an appropriate RGB timing relationship based on display conditions. In this respect, the time duration each light source is on in a given display frame may be based on display conditions. For example, if an image to be displayed has a relatively high red content, as compared to the image's green and blue content, red light source 22 may be on for a longer relative time during display of such an image.

Referring to FIG. 4, a timing diagram illustrating 1× RGWB timing according to an embodiment of the present invention is indicated generally at 80. Such a timing relationship may be used when a higher brightness, as compared to the timing relationships shown in FIGS. 2 and 3, is desired. Such a situation may include an environment where ambient light may detract from viewability of image 52 without increasing the brightness.

As may be seen in FIG. 4, frame start trace 82 includes a pulse 82a, which indicates the beginning of a display frame, as previously discussed. Red (R) trace 84 indicates that red light source 22 turns on at the beginning of the display frame for time duration $t_R$. As indicated by green (G) trace 86, green light source 24 turns on for time duration $t_G+t_W$ when red light source 22 is turned off for the first time during the indicated display frame.

It may also be seen from red trace 84, green trace 86 and blue (B) trace 88 in FIG. 4, that red light source 22 and blue light source 26 turn on at the beginning of time duration $t_W$ (during which green light source 24 is already on). In such a situation green light may be produced during time duration $t_G$, while white light may be produced during time period $t_W$, as white light is produced by the sum of red, green and blue light. This situation may increase the brightness of image 52 when displayed. FIG. 3 also shows that at the end of time period $t_W$, red light source 22 and green light source 24 may turn off, whereas blue light source 26 may remain on for time duration $t_B$.

Referring to FIG. 5, a timing diagram illustrating 1× RYGWB timing according to an embodiment of the present invention is indicated generally at 90. As may be seen in the first display frame portion of timing diagram 90, red light source 22 and green light source 24 may be on simultaneously for a time $t_Y$, so as to produce yellow light, the sum of red and green light. It will be appreciated, that in this particular situation, green light source 24 may be on individually (producing green light) for a relatively shorter duration of time than red light source 22 and/or blue light source 26 during the first display frame, as is shown in timing diagram 90.

As may also be seen in FIG. 5, the second display frame of timing diagram 90 may be substantially similar to 1× RGWB timing diagram 80, with the red, green, white and blue timing durations being indicated respectively by $t_R'$, $t_G'$, $t_W'$ and $t_B'$. Such a situation may be beneficial where an image being displayed during the first display frame of timing diagram 90 has a higher yellow content than an image being displayed during the second display frame of timing diagram 90. In other words, display system 10 may modify the gamut produced for displaying images frame by frame, based on display conditions, as were previously described. It will be appreciated, of course, that any of the aforementioned examples may be 2×, 3×, 4×, etc.

Figure 6:
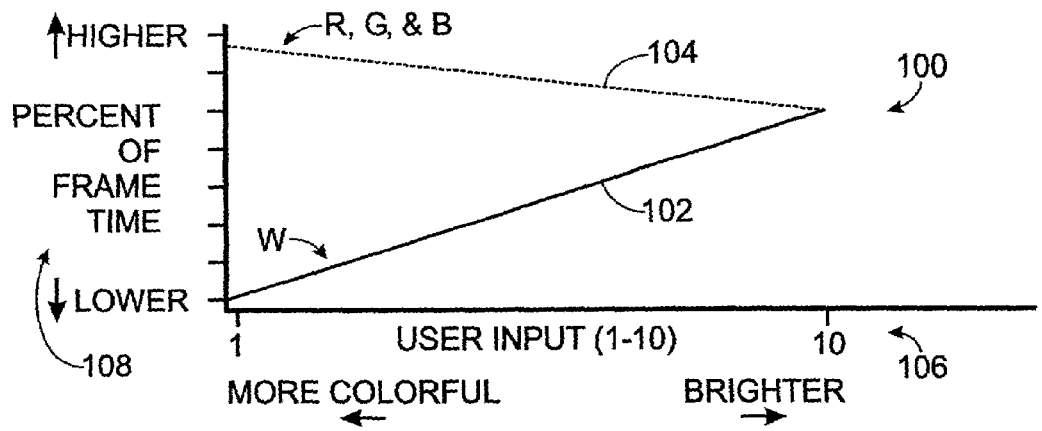
FIG. 6 is a graph showing a relationship of maximum brightness to chroma that may be used to display images based on a user preference according to an embodiment of the present invention.

Referring now to FIG. 6, with further reference to FIGS. 1, 2 and 4, a graph showing an exemplary timing relationship based on an input signal to controller 14 from gamut selection device 20 for displaying image 52 is shown generally at 100. For graph 100, the x-axis represents a continuous range of gamut selection values. The y-axis of graph 100 represents the percent of frame time each type of light is produced in a given display frame. For this embodiment; red, green and blue light may be generated for equivalent time durations, or percentages of a given display frame.

As may be seen from line 102 on graph 100, the percent of time that white light is produced during a given display frame with respect to red, green and blue light, as indicated by line 104, varies linearly with a user input 106. In this respect, when user input 106 is 1, white light is not generated, or represents zero percent of the frame, while red, green and blue light are each generated for one-third (33.33%) of a given display frame. Such a situation corresponds with 1× RGB timing as shown in FIG. 2. Comparing line 102 and line 104 of graph 100 demonstrates the relative percentage of frame time 108 that white light, red light, green light and blue light are generated for this embodiment. In this respect, a lower user input corresponds with a lower percentage of frame time 108 during which white light is generated.

As shown in FIG. 6, at the highest (10) user setting 106, the percent of frame time 108 during which white light is generated may be approximately the same as the percentages during which red, green and blue light is generated, or one-quarter (25%) of a given display frame. This situation corresponds to 1× RGWB timing, as is shown in FIG. 4. It will be appreciated that these relationships are exemplary and other percentage and timing relationships are possible. For example, the percent of frame time 108 relationships may be non-linear; red, green and blue light percentages may be varied individually; or further limits on percent of frame time 108 during which white light is produced may be implemented.

Figure 7:
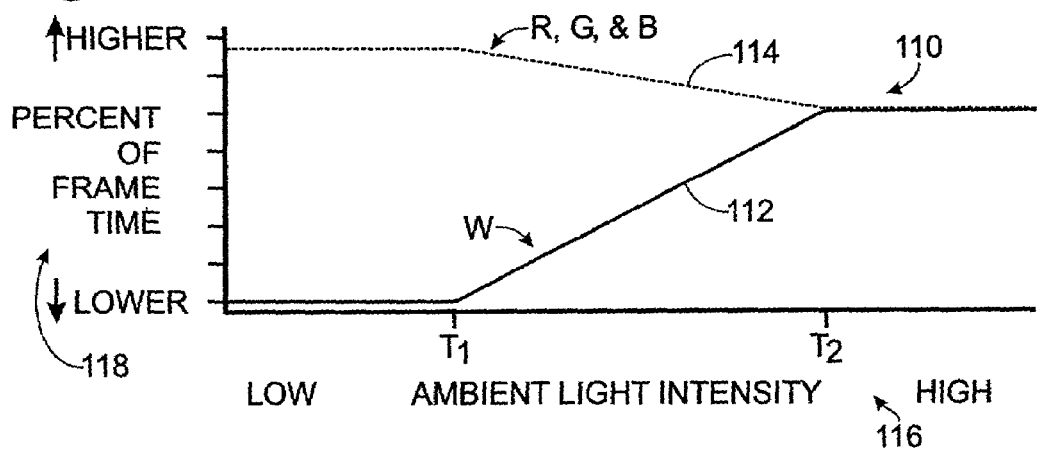
FIG. 7 is a graph showing a relationship of maximum brightness to chroma that may be used to display images based on ambient light intensity according to an embodiment of the present invention.

Referring now to FIG. 7, a graph illustrating an exemplary timing relationship based on ambient light character such as intensity information is indicated generally at 110. In this respect, line 112 in FIG. 7 indicates a percentage of white light, relative to line 114, which indicates a percentage of red, green and blue light. At lower ambient light intensities, below threshold T1, no white light is produced (0% of a given frame) while red, green and blue light are each produced for one-third (33.33%) of a given display frame. In similar fashion as was discussed with regard to FIG. 6, such a situation may correspond with the timing relationship shown in FIG. 2.

As with FIG. 6, the relationship of percent of frame time 118 during which each type of light is generated is demonstrated by comparing lines 112 and 114 in graph 110. As can be seen from graph 110, the percent of time that white light is generated during a given display frame with respect to red, green and blue light, may vary linearly as ambient light intensity varies between threshold T1 and threshold T2. At ambient light intensities at or above threshold T2, red, green, white and blue light may each be generated for one-quarter (25%) of a given display frame, as indicated by FIG. 7. Such a situation may correspond to the timing relationship shown in FIG. 4.

Figure 8:
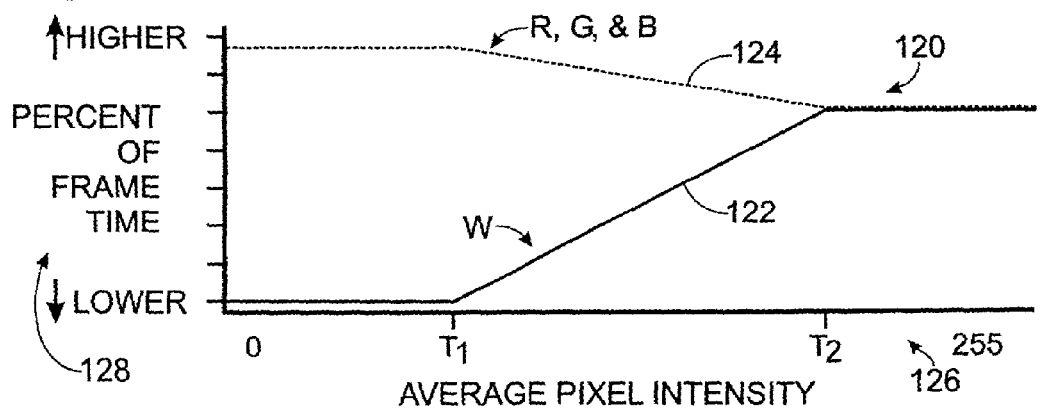
FIG. 8 is a graph showing a relationship of maximum brightness to chroma that may be used to display images based on image content as determined by average pixel intensity according to an embodiment of the present invention.

Referring now to FIG. 8, a graph illustrating an exemplary timing relationship based on average pixel intensity is indicated generally at 120. In this respect, line 122 in FIG. 8 indicates a percentage of white light generated in a given display frame, relative to line 124, which indicates a percentage of red, green and blue light generated in that display frame. At lower average pixel intensities, below threshold T1, no white light (0% of the display frame) may be produced, while red, green and blue light may each be produced for one-third (33.33%) of the display frame. In similar fashion as was discussed with regard to FIGS. 6 and 7, such a situation may correspond with the timing relationship shown in FIG. 2.

As with FIGS. 6 and 7, the relationship of percent of frame time 128 in FIG. 8 during which each type of light is generated is demonstrated by comparing lines 122 and 124 in graph 120. As can be seen from graph 120, the percent of time that white light is generated during a given display frame with respect to red, green and blue light, may vary linearly as average pixel intensity varies between threshold T1 and threshold T2. At average pixel intensities at or above threshold T2, red, green, white and blue light may each be generated for one-quarter (25%) of a given display frame, as indicated by FIG. 8. As was the case with FIGS. 6 and 7, such a situation may correspond to the timing relationship shown in FIG. 4. As with FIGS. 6 and 7, it will be appreciated that the relationships illustrated in FIG. 8 are exemplary and other percent of field time 128 relationships may exist.

As was previously discussed, image data 12 may be pre-processed to reduce variation in display of an associated image across various display devices. In this respect, FIG. 9 is a graph showing a gamma correction relationship indicated generally at 130. Such a relationship may be used to modify image data to reduce the amount of variation in the appearance of an image from one type of display system to another. In this respect, the relationship shown in graph 130 is a family of curves for equation 132, $y=x^\gamma$. This relationship, with a specific value of γ (gamma), may be applied to red, green and blue components of colors for an image to be displayed. Alternatively, correction with individual values of gamma may be applied to each component. In this respect, x may represent a red intensity for a specific pixel in an image. y would then typically represent the gamma corrected red intensity. As may be seen in FIG. 9, line 134 corresponds to the situation where gamma is equal to one. In this case, gamma correction would not be made. As is also shown in FIG. 9, the group of curves indicated by 136 corresponds to correction factor relationships where gamma is less than one. Conversely the group of curves indicated by 138 corresponds to correction factor relationships where gamma is greater than one.

FIG. 10 illustrates a linear color matrixing relationship, which is indicated generally at 140. Equations 142 represent linear relationships for accomplishing a conversion between a first set of red, green and blue components of an original color, $R_O$, $G_O$, and $B_O$, respectively. Correction factors may be applied to these color components to calculate a new red value. In this respect, "new-red" may be determined by applying a red—red color correction factor $C_{RR}$ to $R_O$, a red-green correction factor $C_{RG}$ to $G_O$, and a red-blue correction factor $C_{RB}$ to $R_O$. Likewise, similar correction factors, as are indicated in equations 142, may be applied to determine "new-green" $G_N$ and "new-blue" $B_N$.

Equations 142 may be implemented in a linear matrix relationship 144. In this respect, an "original" color vector 146 may be multiplied by a correction factor matrix 148, which may include the correction factors of equations 142, to produce a "new" color vector 150. It will be appreciated that image data may be modified via various correction factors, color matrices, exponential relationships and look-up tables. For example, not all correction factors may be applied in certain circumstances. The color matrixing relationship used may depend on, at least, display conditions, the display system used to display the images, and image type. Look-up tables may preserve computational resources. Other factors exist, and the invention is not limited to these specific conditions.

Referring now to FIG. 11, a flowchart illustrating a method for displaying an image according to an embodiment of the present invention is indicated generally at 150. As is shown in FIG. 11, method 150 may include receiving image data at 152. That image data may then have a correction factor, such as gamma and/or color matrix correction, applied to it at 154. Display conditions, such as those previously described, may be determined at 156. The image may then be displayed at 158 by sequencing light sources in an appropriate display device based on the display conditions determined at 156. The method may use any of the foregoing described approaches for such a method, however, the invention is not so limited and other techniques are possible.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. An image display device comprising:
a plurality of light sources capable of being independently activated;
a controller coupled with the light sources, wherein the controller is configured to modify sequencing of the light sources to display an image based on display conditions; and
an image content analyzer configured to determine one or more image content attributes of the image and provide an indication of the content attributes to the controller, so as to enable the controller to modify the sequence of the light sources to adjust gamut of the image based on the one or more image content attributes.

2. The display device of claim 1, wherein sequencing of the light sources is further based on a gamut selection.

3. The display device of claim 2, wherein the gamut selection includes a range of selectable values such that gamut of the image is modified as a result of varying sequencing of the light sources in response to selection of a specific selectable value.

4. The display device of claim 3, wherein the gamut of the image varies linearly in relation with the range of selectable values.

5. The display device of claim 1, further comprising an ambient light sensor configured to determine a character of ambient light in an environment in which the display device is operating and provide an indication of the character of ambient light to the controller, so as to enable the controller to further modify sequencing of the light sources to adjust a gamut of the image based on the ambient light character.

6. The display device of claim 1, wherein the one or more image content attributes include at least one of a number of unique colors, a frequency of the unique colors, an average pixel intensity, and a frame-to-frame image content change.

7. The display device of claim 1, wherein the one or more image content attributes include an image source type and the gamut is set based on the image source type.

8. The display device of claim 7, wherein the image source type is at least one of graphics, video, still photos, broadcast television and video games.

9. The display device of claim 1, wherein the image content analyzer includes video pipeline hardware configured to determine the one or more image content attributes.

10. The display device of claim 1, further comprising a display appearance analyzer configured to determine one or more appearance attributes of the displayed image and provide an indication of the appearance attributes to the controller so as to enable the controller to further modify the sequence of the light sources to adjust a gamut of the image based on the one or more content attributes.

11. The display device of claim 1, wherein the plurality of light sources includes a red light source, a green light source and a blue light source.

12. The display device of claim 11, wherein the plurality of light sources further includes at least one of a white light source, a cyan light source, a magenta light source and a yellow light source.

13. The display device of claim 1, wherein the plurality of light sources are solid-state light sources.

14. The display device of claim 13, whereinihe solid-state light sources are light emitting diodes.

15. An image projector comprising:
a plurality of solid-state light sources;
a controller coupled with the light sources;
an image content analyzer configured to determine at least one image content attribute and coupled with the controller so as to cooperate to dynamically modify sequencing of the light sources to display an image based on the at least one image content attribute, so as to adjust gamut based on the at least one image content attribute; and
an optical system optically coupled with the plurality of light sources and coupled with the controller, wherein the optical system is configured to cooperate with the controller and the light sources to display the image.

16. The image projector of claim 15, wherein the solid-state light sources are light emitting diodes.

17. The image projector of claim 15, wherein the solid state light sources include a red light source, a green light source and a blue light source.

18. The image projector of claim 15, wherein the optical system includes a spatial light modulator coupled with the controller to synchronize the spatial light modulator with the light sources to display the image.

19. The image projector of claim 18, wherein the spatial light modulator is a digital micro-mirror device.

20. The image projector of claim 15, which further comprises an ambient light sensor configured to determine an intensity of ambient light in an environment in which the image projector is operating, and to provide an indication of that intensity of ambient light to the controller, so as to enable the controller to further modify the sequence of the light sources based on an ambient light intensity.

21. The image projector of claim 15, wherein the image data is modified based on a color matrix prior to the image being displayed.

22. The image projector of claim 15, wherein the image data is modified based on an exponential relationship prior to the image being displayed.

23. The image projector of claim 15, wherein the controller is one of a microprocessor and a micro-controller.

24. A method of displaying an image in a display device having plural light sources, where the tight sources are capable of being independently activated, the method comprising:
receiving image data associated with an image to be displayed;
determining one or more image content attributes of the image; and
dynamically sequencing the plural light sources to display the image based on the image content attributes, so as to adjust gamut of the image based on the one or more image content attributes.

25. The method of claim 24, wherein the method further comprises detecting a gamut setting, so as to adjust a gamut of the image based on the gamut setting.

26. The method of claim 24, wherein the method further comprises detecting an ambient light character
communicating the ambient light character to a controller; and
modifying a gamut of the image based on the ambient light character.

27. The method of claim 26, wherein modifying the gamut includes varying a percentage of white frame time.

28. The method of claim 24, wherein determining the one or more image content attributes includes determining at least one of a number of unique colors, a frequency of the unique colors, an average pixel intensity, a frame to frame image content change, and an image source type.

29. The method of claim 28, wherein sequencing the light sources includes varying a percentage of white frame time.

30. The method of claim 24, which further comprises analyzing the displayed image to determine one or more appearance attributes of the displayed image.

31. The method of claim 24, wherein dynamically sequencing the light sources includes activating two or more light sources simultaneously during the display of the image.

32. The method of claim 24, wherein sequencing the light sources includes repeating a specific sequence of the multiple light sources during a single frame.

33. The method of claim 24, further comprising modifying the image data based on at least one of a color matrix, an exponential relationship, and a look-up table.

34. An article comprising:
a storage medium having a plurality of machine-readable instructions, wherein when the instructions are executed, the instructions provide for
receiving image data associated with an image to be displayed;
determining one or more image content attributes of the image; and
dynamically sequencing plural light sources of a display device to display the image, wherein the sequencing is based on the image content attributes, so as to adiust gamut of the image based on the one or more image content attributes.

35. The article of claim 34, wherein the instructions further provide for determining a gamut selection setting, so as to adjust a gamut of the image based on the setting.

36. The article of claim 34, wherein the instructions further provide for detecting an ambient light character;
communicating the ambient light character to a controller; and
modifying a gamut of the image based on the ambient light character.

37. The article of claim 36, wherein modifying the gamut of the image includes varying a percentage of frame time wherein white light is produced.

38. The article of claim 34, wherein determining the one or more image content attributes includes determining at least one of a number of unique colors, a spatial frequency analysis of the unique colors, an average pixel intensity, a frame to frame image content change, and an image source type.

39. The article of claim 38, wherein the instructions for sequencing the light sources provide for varying a percentage of frame time wherein white light is produced.

40. The article of claim 34, wherein sequencing the multiple light sources includes repeating a specific sequence of the multiple light sources during a single frame.

* * * * *

UNITED STATES PATENT AND TRADEMARK OFFICE
CERTIFICATE OF CORRECTION

PATENT NO. : 7,019,736 B2  Page 1 of 1
APPLICATION NO. : 10/103394
DATED : March 28, 2006
INVENTOR(S) : Allen et al.

It is certified that error appears in the above-identified patent and that said Letters Patent is hereby corrected as shown below:

In the Claims

Col. 9 (line 28), delete "whereinihe", and insert therefor --wherein the--.

Col. 10 (line 4), delete "tight" and insert therefor --light--.

Col. 10 (line 19), delete "character" and insert therefor --character;--.

Col. 10 (line 49), delete "for" and insert therefor --for:--.

Col. 10 (line 56), delete "adiust" and insert therefore --adjust--.

Signed and Sealed this

Twenty-sixth Day of December, 2006

JON W. DUDAS
*Director of the United States Patent and Trademark Office*